United States Patent [19]

Etherington et al.

[11] Patent Number: 4,680,801

[45] Date of Patent: Jul. 14, 1987

[54] SIGN VERIFICATION

[75] Inventors: Harry J. C. Etherington, Surrey; Paul C. Joslin, Berks; Rowland A. G. Dunkley, Bedfordshire, all of England

[73] Assignee: The De La Rue Company PLC, England

[21] Appl. No.: 774,595

[22] Filed: Aug. 30, 1985

[30] Foreign Application Priority Data

Jan. 9, 1984 [GB] United Kingdom ................. 8400390
Jan. 9, 1985 [WO] PCT Int'l Appl. ... PCT/GB85/00009

[51] Int. Cl.⁴ ................ G06K 9/00
[52] U.S. Cl. ................ 382/3; 382/30
[58] Field of Search ................ 382/3, 30, 34, 13

[56] References Cited

U.S. PATENT DOCUMENTS 4,028,674 6/1977 Chuang ................ 382/3
4,040,010 8/1977 Crane et al. ................ 382/30

FOREIGN PATENT DOCUMENTS 1480066 7/1977 United Kingdom .
2039118 7/1980 United Kingdom .
1595243 8/1981 United Kingdom .
2104698 3/1983 United Kingdom .

OTHER PUBLICATIONS

IBM Technical Disclosure Bulletin, vol. 21, No. 1, Jun. 1978, "Supervised Adaption for Signature Verification System", Anthony et al., pp. 424–425.
IBM Technical Disclosure Bulletin, vol. 24, No. 2, Jul. 1981, "Personal Identification Systems Performance Improvement Algorithm" by Grossman et al., pp. 914–917, WO 82/03485 (NCR), Oct. 14, 1982.

*Primary Examiner*—David K. Moore
*Assistant Examiner*—Jacqueline Todd
*Attorney, Agent, or Firm*—Ostrolenk, Faber, Gerb & Soffen

[57] ABSTRACT

A method of determining whether the writer of a sign is the same as the writer of a previously written sign at least one characteristic feature of which has been prerecorded comprises: (a) detecting at least one characteristic feature of the written sign; (b) comparing the or each detected feature with the corresponding prerecorded feature (s); (c) generating an acceptance signal if all differences between the detected and the prerecorded features lie within first predetermined limits; (d) if an acceptance signal cannot be generated, obtaining one or more further written signs (up to a predetermined maximum) and repeating steps (a) to (c) with the or each further written signs; (e) if an acceptance signal cannot be generated for the or any of the further written signs, comparing the differences between the characteristic features of each written sign and the corresponding characteristic of the prerecorded sign and, if all the differences fall within second predetermined limits; (f) comparing corresponding characteristic features of the written signs and generating an acceptance signal if all differences between the features lie within third predetermined limits.

20 Claims, 6 Drawing Figures

SIGN VERIFICATION

BACKGROUND OF THE INVENTION

The invention relates to a method of determining whether the writer of a sign is the same as the writer of a previously written sign.

Credit or cash card transactions rely on either, or both the visual comparison of a submitted signature with that on the card or the use of a Personal Identity Number (PIN). For a number of reasons, these do not provide a particularly secure means of identification.

The signature written during a transaction is often given minimal, if any, comparison with that existing on the card, while the signature on the card may also be forged. PIN numbers are often not remembered and may be stored by the user in such a way that the illegal acquisition of the card will also reveal the PIN number.

In view of these problems, there is a desire for some method of automatic sign, particularly signature, verification which does not rely on a simple visual comparison and which also allows for the use of unattended, automatic transaction apparatus. An important performance parameter in any such application is that the acceptance of valid signatures should be high (preferably greater than 99%), requiring that any verification system should accept day to day variations of genuine signs. In the case of credit or cash cards, any non-confirmation of a signature results in a referal to the card company which is expensive.

In one prior proposal described in IBM Technical Disclosure Bulletin Vol. 21, No. 1 June 1978 a system is described in which a user initially supplies six sample signatures which are stored in a data bank. Subsequent signatures are compared with the six stored signatures. If a successful comparison cannot be made then provision is made to change, under supervision, the stored signatures so that they more closely reflect the changes than have occurred in the person's signature since the original signatures were recorded. Such systems are expensive because they rely on the combination of an on-line connection to a host computer, an inbuilt system data base, and some method of recording prerecorded signatures.

These techniques are not feasible for an off-line system which incorporates no data base.

GB-A-1480066 illustrates a verification system in which if a first signature cannot be verified the user is given the opportunity of providing a second signature which is processed in a similar way. If this signature also cannot be verified then the signatory is rejected. A modification of this method in which parameters setting the limits for acceptance may be updated is disclosed in GB-A-2104698. Both these prior art methods are very simple in form and rely solely on repeating the verification procedure independently on two different signatures.

A far more sophisticated verification system is described in IBM Technical Disclosure Bulletin Vol 24. No. 2 of July 1981. This provides for the inputting of up to four repeat signatures and carries out various complex comparison steps. The problem with this system is that it is very undesirable to require a signer, particularly a genuine signer, to repeat his signature up to four times.

BRIEF DESCRIPTION OF THE INVENTION

In accordance with the present invention, a method of determining whether the writer of a sign is the same as the writer of a previously written sign at least one characteristic feature of which has been prerecorded comprises:

(a) detecting at least one characteristic feature of the written sign;

(b) comparing the or each detected feature with the corresponding prerecorded feature(s);

(c) generating an acceptance signal if all differences between the detected and the prerecorded features lie within first predetermined limits;

(d) if an acceptance signal cannot be generated, obtaining one or more further written signs (up to a predetermined maximum) and repeating steps (a) to (c) with the or each further written sign;

(e) if an acceptance signal cannot be generated for the or any of the further written signs, comparing the differences between the characteristic features of each written sign and the corresponding characteristics of the prerecorded sign and, if all the differences fall within second predetermined limits;

(f) comparing corresponding characteristic features of the written signs and generating an acceptance signal if all differences between the features lie within third predetermined limits.

We have devised a verification system which provides a high degree of acceptance of genuine signs but which typically only requires up to two signs to be written. It also uses information gained from the signs when making a decision unlike the very simple prior art systems mentioned above.

In addition, with this invention, no amendment of the prerecorded features is attempted but rather the method allows for some variations in the written sign provided such variations are within predetermined limits. Essentially, the invention relies on the fact that in two genuine signs, that is signs that have been written by the same writer as the previously written sign, any differences which make each sign of marginal acceptability will tend to be similar in that they occur at the same position or positions in the sign and are of a similar degree. In contrast, with two forged signs, it is likely that each forged sign will differ from the previously written sign in different ways and even if both forged signs are individually marginally acceptable, a comparison between the two signs themselves will indicate that differences have occurred in respect of different features and thus overall the writer is not acceptable as a genuine writer.

The result of this method is that even if a first written sign is not accepted, there is a very high chance that if the writer is genuine, the writer will be accepted on writing a second sign, resulting in a greater than 99% acceptance capability for genuine writers.

Conveniently, the predetermined limits are defined by thresholds with which comparisons are made. In many cases only an upper limit need be defined thus requiring respective single thresholds which are exceeded when the limit is not met.

The characteristic features which are prerecorded and detected may be dynamic features such as total in contact time, spatial features such as the length of the sign, the number of vertical reversals in the sign and the like or any combination of dynamic and spatial features.

In theory any known features may be used, for example any of those described in GB-A-1480066.

BRIEF DESCRIPTION OF THE DRAWINGS

One example of apparatus for carrying out a method in accordance with the present invention will now be described with reference to the accompanying drawings, in which.

DETAILED DESCRIPTION OF THE DRAWINGS

Figure 1:
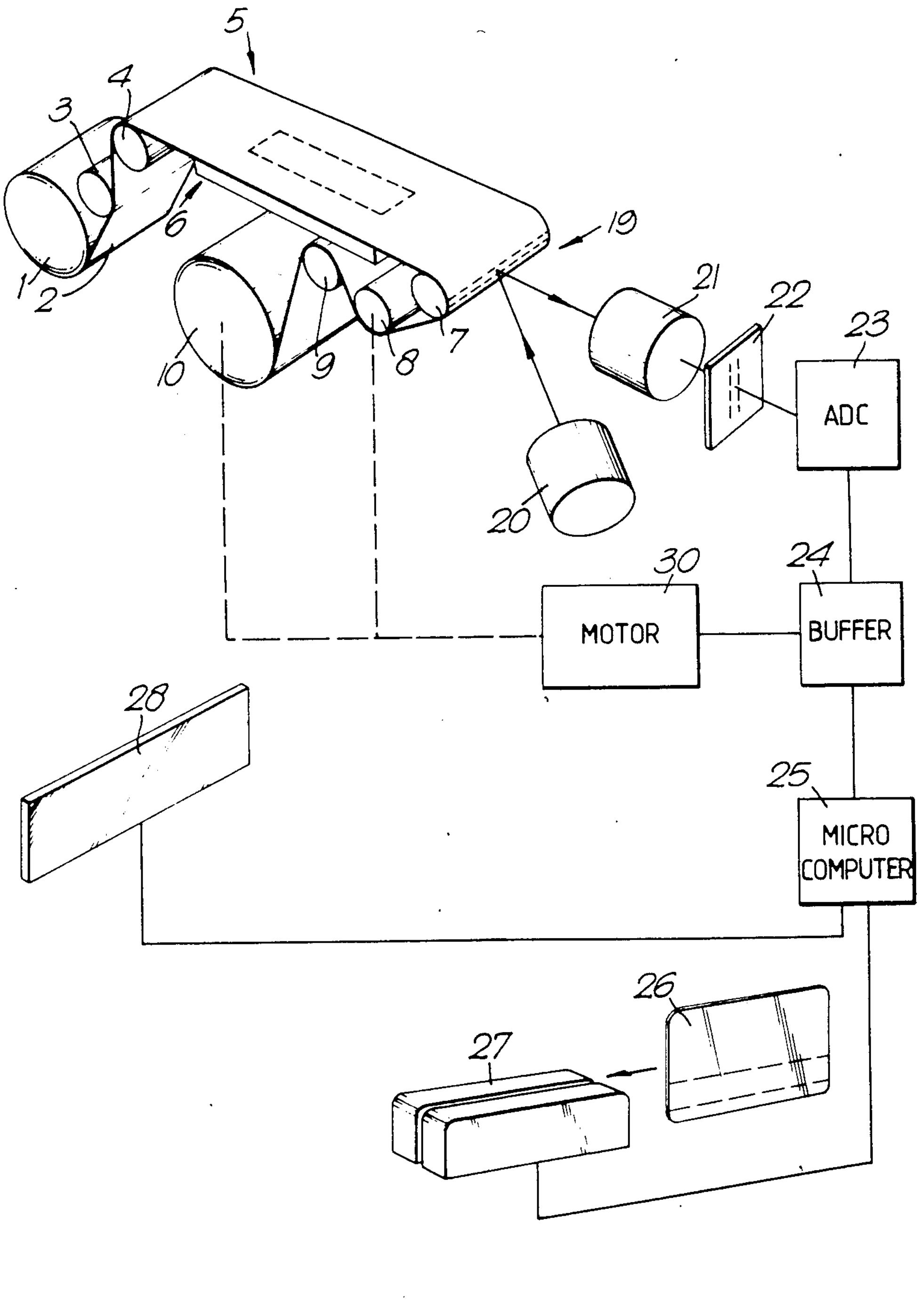
FIG. 1 is a schematic block diagram of the apparatus with some parts omitted for clarity.

The apparatus comprises a feed roller 1 around which is wound a length of paper 2. The paper 2 is fed past a friction brake 3 and over a guide roller 4 to a writing station 5. The writing station 5 comprises a pressure sensitive pad or assembly 6 to be described in detail below. The paper 2 passes from the writing station 5 to a guide roller 7, past a drive capstan 8 and a guide roller 9 to a take up roller 10 around which the paper 2 is rolled.

Figure 2:
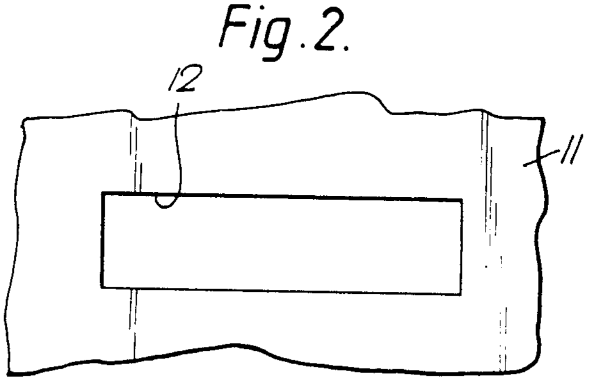
FIG. 2 is a partial plan of the pressure sensitive assembly shown in FIG. 1.
Figure 3:
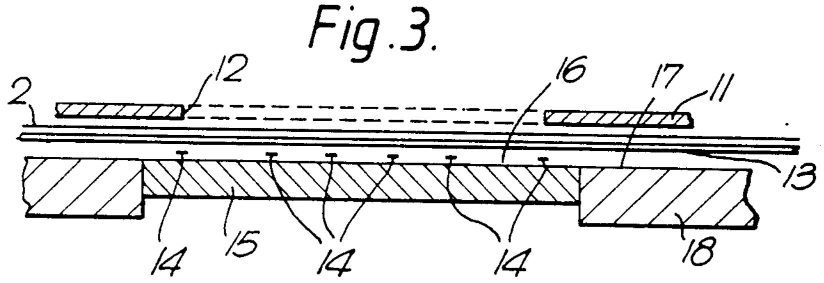
FIG. 3 is a cross-section through the pressure sensitive assembly shown in FIG. 2.

The writing station 5 is shown in more detail in FIGS. 2 and 3. A mask 11 in the form of a protective plate (not shown in FIG. 1) is mounted above the paper 2 and defines a signing aperture 12 of rectangular form. A diaphragm 13 is mounted below the paper 2 and is spaced by a plurality of spacers 14 from a base 15. An upper surface 16 of the base 15 is flush with an upper face 17 of a supporting housing 18.

The apparatus described above will normally be housed in a secure housing (not shown) inaccessible to the user and conveniently the rollers 1, 4, 7, 8, 9 and 10, and the friction brake 3 will be mounted in a cartridge which can be slotted into the supporting housing.

The length of the paper 2 at the writing station 5 will be in a state of tension caused by the action of the brake 3 and the drive capstan 8. This assists in preventing tearing of the paper. The width of the paper 2 is at least twice that of the aperture 12. The roller 7 is positioned close to the right hand edge of the aperture 12, as seen in FIG. 2, to minimise the length of paper between the signing aperture 12 and a static characteristic scanning station 19.

In use, a signatory will write his signature within the aperture 12 on the paper 2. The action of signing causes a transfer of writing pressure, through the paper 2, to the diaphragm 13 which deflects to make electrical contact with the base 15. The stiffness of the diaphragm 13, the amount of spacing between diaphragm 13 and the base 15, and the separation between spacers 14 are all determined to achieve a sensitive response during signing. When a signature has been completed, the drive capstan 8 and take-up roller 10 are activated to drive paper across the writing station 5 through the aperture between the mask 11 and the supporting housing 18 to move the section of the paper 2 on which a signature has been written to the static characteristic sensing station 19. This also brings a fresh, unmarked, section of paper 2 into the writing station 5. During movement of the paper 2, the paper is maintained in tension by means of the friction brake 3.

While the signature is moved through the station 19, it is illuminated by an illumination assembly 20 which illuminates a uniform strip of the paper 2, the illuminated strip being imaged via a scanning or optical system 21 onto a linear array of photo-sensitive elements 22 such as photoelectric diodes. The drive capstan 8 is actuated to cause the paper to be incremented through the station 19 at a constant velocity to assist the scanning step. The velocity is chosen so that, in one scan of the array 22, the paper 2 moves nominally one array element width.

The signals generated by the array 22 are fed to an analogue to digital converter 23 which digitises the analogue signal output by the array 22 by comparing this video signal with a reference level. The video signal from the array 22 is defined as "black" or "white" depending upon whether it is greater or less than this reference level. The reference level is related to the video signal in such a way that it tracks long term changes in the level of the video signal and it is insensitive to short term (rapid) changes. The digitised signal is fed to a control buffer 24 and from there to a conventional micro-computer 25 based on Z80 STD where it is stored and processed.

Figure 5:
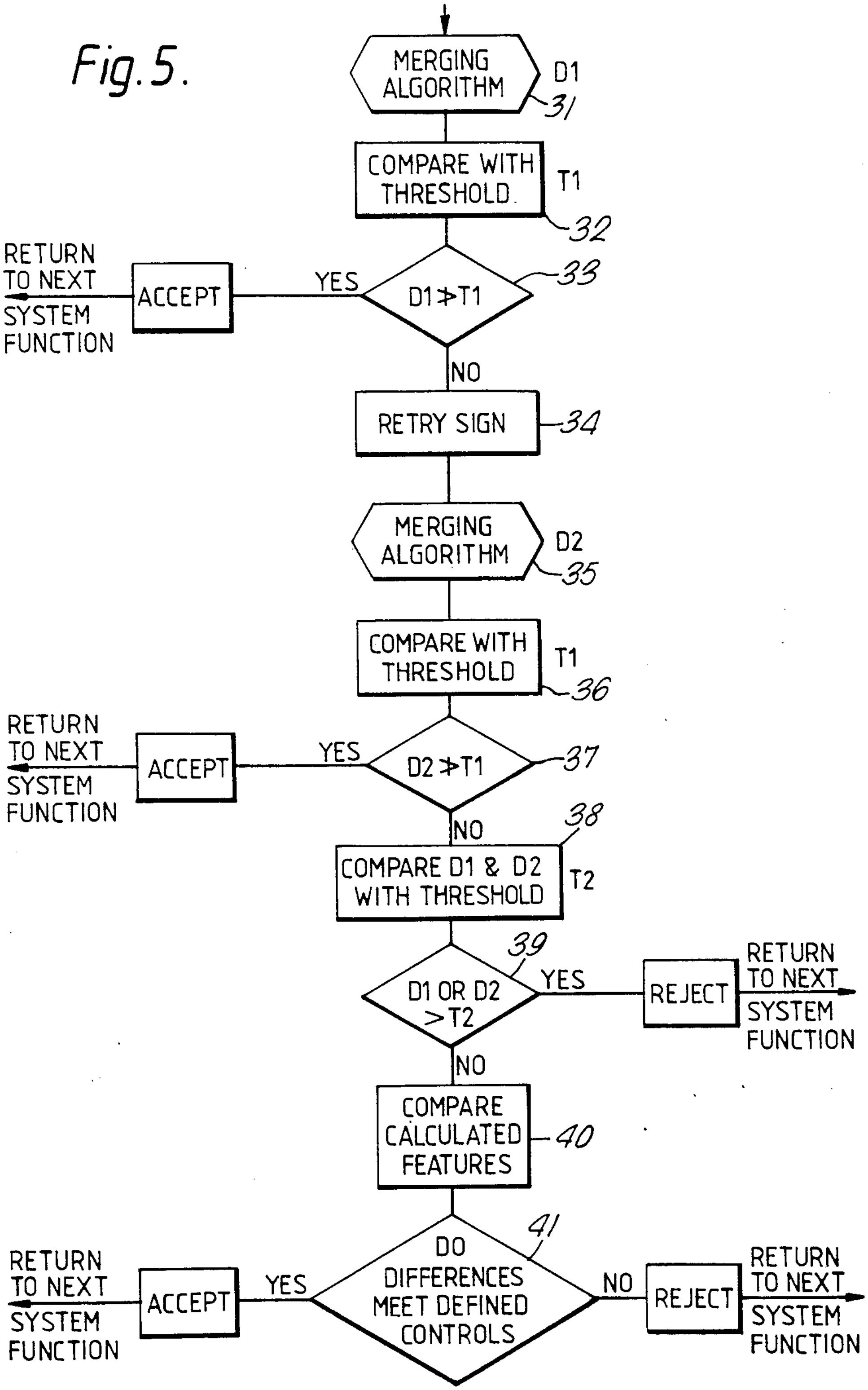
FIG. 5 is a flow diagram illustrating other steps carried out by the microcomputer; and, FIG. 6 illustrates a modification to the flow diagram of FIG. 5.

The microcomputer 25 controls the overall operation of the apparatus. The main steps of the computer program stored by the microcomputer 25 are illustrated in FIG. 5.

The microcomputer continually senses for the initiation of contact between a writing instrument and the assembly 6 which is sufficient to depress the diaphragm 13 onto the base 15. Electrical signals are then passed along an electrical circuit including a power source (not shown) from the base 15 to the microcomputer 25. The microcomputer determines the contact time (TIC) during which the writing instrument remains in contact with the assembly 6 and detects when the signals cease corresponding to the lifting of the writing instrument from the assembly. As soon as contact has ceased, the determined TIC is added to a TIC running total and the microcomputer starts to time the period for which the instrument is out of contact with the assembly 6 to generate an out of contact time (TOC). This out of contact time may correspond to a period within the signature or to the writing instrument being lifted from the assembly 6 when a signature has been completed. To distinguish between these situations the microcomputer senses for further contact occuring and if this is detected to TOC is added to a TOC running total and the steps for recording TIC are repeated. If no contact is detected the current TOC is compared with a reference which has a value such that if the TOC is greater than the reference this will mean that the signature has been completely written. Thus, if the TOC is less than the reference the TOC continues to be updated.

Once the microcomputer 25 determines that a complete signature has been written it causes a drive motor 30 to activate the drive capstan 8 and the take up roller 10 for a predetermined time period to draw the paper 2 across the assembly 6 and to bring the written signature into the static characteristic sensing station 19.

The microcomputer then determines one or more temporal characteristic measures. For example, these measures may comprise the total time for writing the signature which equals TIC+TOC and a measure equal to (TOC)/(TOC+TIC).

As the paper 2 is incremented through the station 19 the microcomputer 25 receives digital signals (as previously described) representing the signature and from which it determines certain static characteristic measures. Examples of static characteristic measures which may be determined are described in GB-A-2104698. In particular, the microcomputer 25 may determine the total chord length and the length and height 10%-90% of the signature. These latter two features are determined by constructing firstly two vertical lines outside which 10% of the signature lies at each end and then measuring the horizontal separation of the lines; and secondly by constructing two horizontal lines outside which 10% of the signature lies and measuring the vertical separation of these lines.

The microcomputer 25 next reads reference data from a magnetic card 26 belonging to the user which is positioned in a magnetic card reader 27 of conventional form. The information stored on the magnetic strip of the card 26 corresponds to typical values for the dynamic and static characteristic measures of a genuine signature.

The microcomputer 25 then carries out a number of verification steps to determine whether the new signature is genuine. These are described in more detail below. If the signature is verified as genuine the microcomputer 25 causes an appropriate message to be displayed on a monitor 28 visible by the user. The drive motor 30 will stop after the predetermined time period has expired. Thereafter, the microcomputer 25 responds to further instructions from the user or operator depending upon the context in which the apparatus is used. For example, if the apparatus is positioned in cash dispensing apparatus then the microcomputer 25 will allow a desired cash sum to be dispensed to the user. Alternatively, if the apparatus is used to allow access to be gained to a facility, such as a building, it will cause any locks provided to be unlocked.

Alternatively, if verification is not achieved a reject message is displayed on the display 28, the drive motor 30 is stopped (as before) and no further operator instructions are allowed.

Figure 4:
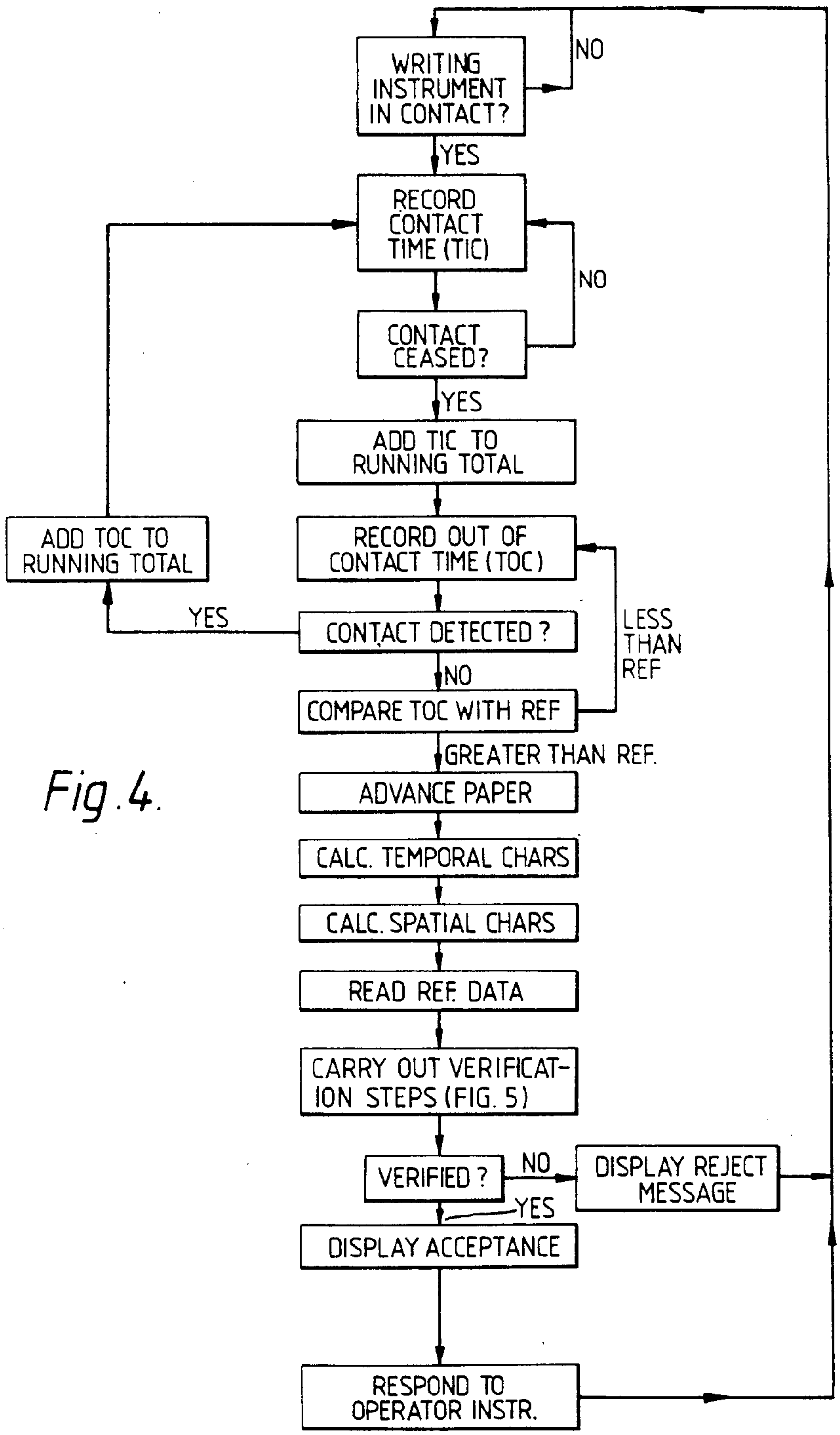
FIG. 4 is a flow diagram illustrating some steps carried out by a controlling microcomputer.

The system then returns to the initial position at the beginning of the flow diagram shown in FIG. 4.

The verification steps carried out by the microcomputer 25 are illustrated in FIG. 5. The calculated data and reference data are merged in a step 31 by comparing corresponding reference and calculated data for each characteristic feature and generating a value D1 related to the differences between the two sets of data. This value D1 is then compared with a predetermined first threshold T1 in a step 32. In step 33, a decision to accept the written signature is made if the threshold T1 has not been exceeded meaning that the differences between the reference and calculated data are of a degree that may be expected from a genuine signer.

If, however, the threshold is exceeded then, in a step 34 the signer is requested to provide a second signature. This involves repeating the steps set out in FIG. 4 as far as the verification step.

Steps 35–37 are then carried out on the second signature, these steps being equivalent to steps 31–33 respectively.

If the decision in step 37 is that the second signature cannot be accepted then this could be due to two possibilities. Firstly, the writer could be genuine but his signature has modified since the original signature was recorded on his card, or secondly the writer is not genuine. In the first case, it is likely that the writer's new signature will be consistently different from the originally recorded signature whereas in the second case it is likely that differences between the signatures will occur in respect of different features or a single difference may be so great that it could not possibly be written by a genuine writer.

To determine which situation exists, the values D1, D2 generated in steps 31 and 35 are each compared in a step 38 with a second predetermined threshold T2 representing a wider limit than the first predetermined threshold T1. If either of the values D1, D2 exceeds the threshold T2 then a decision is made in a step 39 to reject the signer as a forger.

If both values D1, D2 do not exceed the second predetermined threshold then corresponding spatial and dynamic characteristic features of the two new signatures are compared in the step 40. If the differences between these features do not exceed predetermined limits, a decision is made in a step 41 to accept the writer as genuine. Otherwise, the writer is rejected.

The thresholds T1, T2 and the limits of step 41 may be predetermined in any conventional manner, but typically empiricially after a large number of trials.

Figure 6:
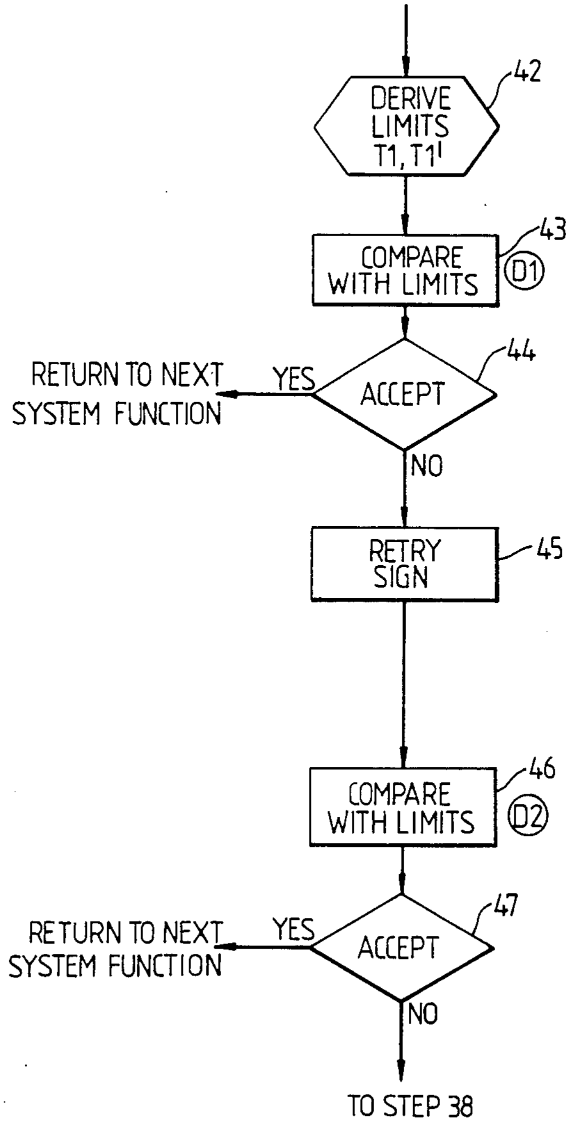

It has recently been proposed, for example in GB-A-2104698 to obtain reference data for storage on a credit or cash card by comparing certain spatial and/or dynamic characteristic features of a number, for example six, of test signatures and for each feature deriving a mean and standard deviation. In this case, the steps carried out by the microcomputer 25 will be slightly different from those shown in FIG. 5. These are illustrated in FIG. 6. Initially, in a step 42, the microcomputer 25 will derive upper and lower limits T1, T1' for each characteristic feature from the means and standard deviations stored on the credit card. For example, this may be in accordance with the simple formulae:

$$T1 = \text{Mean} + \text{Standard Deviation}$$

$$T1' = \text{Mean} - \text{Standard Deviation}$$

Each characteristic feature is then compared in a step 43 with the respective limits and if all the characteristic features fall within their limits a decision is made in a step 44 to accept the signature. If any of the characteristic features fall outside their limits the signature is not accepted and a further signature is requested in a step 45. The same characteristic features for the second signature are compared with the originally derived limits T1, T1' in a step 46 and a further decision is made in a step 47 to accept the second signature if all the characteristic features fall within their limits. If any of the features do not fall within their limits the signature is not accepted and further processing is carried out in accordance with the steps 38–41 FIG. 5. In this case, the values D1, D2 required in the step 38 would represent the total amount by which the various features differed from the respective limits.

We claim:

1. A method of determining whether the writer of a contemporaneously written sign is the same as the writer of a previously written sign, at least one characteristic feature of said previously written sign having been prerecorded, the method comprising the steps of:

(a) obtaining a contemporaneously written sign;

(b) detecting at least one characteristic feature of said contemporaneously written sign;

(c) comparing each detected feature of said contemporaneously written sign with a corresponding prerecorded feature of said previously written sign;

(d) generating an acceptance signal if the differences between the detected and the prerecorded features lie within first predetermined limits;

(e) if an acceptance signal cannot be generated, obtaining at least one further contemporaneously written sign and repeating steps (b) to (d) with respect to each further contemporaneously written sign;

(f) if an acceptance signal cannot be generated for any of said at least one further contemporaneously written sign, comparing the differences between the characteristic features of each contemporaneously written sign and the corresponding characteristics of said previously written sign and, if all the differences fall within second predetermined limits; then (g) comparing characteristic features of each of said contemporaneously written sign with corresponding characteristic features of the remaining said contemporaneously written signs and generating an acceptance signal if the differences between said corresponding features of all said contemporaneously written signs lie within third predetermined limits.

2. A method according to claim 1, wherein the predetermined limits are defined by thresholds with which comparisons are made.

3. A method according to claim 1, wherein the predetermined limits are defined by respective single thresholds representing upper limits.

4. A method according to claim 1, wherein at least one characteristic feature is a spatial characteristic feature.

5. A method according to claim 1, wherein said second predetermined limits are greater than said first predetermined limits.

6. A method of determining whether the writer of a contemporaneously written sign is the same individual as the writer of a previously written sign, at least one characteristic feature of said previously written sign having been previously recorded, the method comprising the steps of:

(a) obtaining a contemporaneously written sign;

(b) comparing at least one characteristic feature of said contemporaneously written sign with a corresponding prerecorded feature of said previously written sign;

(c) generating an acceptance signal if the differences between said characteristic features of said contemporaneously written sign and said previously written sign lie within first predetermined limits;

(d) if an acceptance signal cannot be generated, obtaining at least one further contemporaneously written sign and repeating steps (b) and (c) with respect to each further contemporaneously written sign;

(e) if an acceptance signal cannot be generated for any of said at least one further contemporaneously written sign, comparing the differences between the characteristic features of each contemporaneously written sign and the characteristic features of said previously written sign and, if all the differences fall within second predetermined limits; then (f) comparing characteristic features of each of said contemporaneously written signs with corresponding characteristic features of the remaining said contemporaneously written signs and generating an acceptance signal if the differences between said corresponding features of all of said contemporaneously written signs lie within third predetermined limits.

7. A method according to claim 6, wherein said predetermined limits are defined by thresholds with which comparisons are made.

8. A method according to claim 6, wherein said predetermined limits are defined by respective single thresholds representing upper limits.

9. A method according to claim 6, wherein said at least one characteristic feature is a spatial characteristic feature.

10. A method according to claim 5, wherein said second predetermined limits are greater than said first predetermined limits.

11. Apparatus to determine whether the writer of a contemporaneously written sign is the same individual as the writer of a previously written sign, at least one characteristic feature of said previously written sign having been previously recorded, said apparatus comprising:

(a) verification means for obtaining a contemporaneously written sign;

(1) detecting at least one characteristic feature of said contemporaneously written sign;

(2) comparing each detected feature of said contemporaneously written sign with a corresponding prerecorded feature of said previously written sign;

(3) generating an acceptance signal if the differences between the detected and the prerecorded features lie within first predetermined limits;

(4) if an acceptance signal cannot be generated, obtaining at least one further contemporaneously written sign and repeating steps (1) to (3) with respect to each further contemporaneously written sign;

(5) if an acceptance signal cannot be generated for any of said at least one further contemporaneously written sign, comparing the differences between the characteristic features of each contemporaneously written sign and the corresponding characteristics of said previously written sign and, if all the differences fall within second predetermined limits; then (6) comparing characteristic features of each of said contemporaneously written sign with corresponding characteristic features of the remaining said contemporaneously written signs and generating an acceptance signal if the differences between said corresponding features of all said contemporaneously written signs lie within third predetermined limits.

12. The apparatus according to claim 11, wherein said predetermined limits are defined by respective single thresholds representing upper limits.

13. Apparatus according to claim 11, wherein said at least one characteristic feature is a spatial characteristic feature.

14. Apparatus according to claim 11, wherein said second predetermined limits are greater than said first predetermined limits.

15. The apparatus according to claim 11, wherein said predetermined limits are defined by thresholds with which comparisons are made.

16. Apparatus for determining whether the writer of a contemporaneously written sign is the same individual as the writer of a previously written sign, at least one characteristic of said previously written sign having been previously recorded, said apparatus comprising:

(a) means for obtaining a contemporaneously written sign;

(b) verification means for:

(1) comparing at least one characteristic feature of said contemporaneously written sign with a corresponding prerecorded feature of said previously written sign;

(2) generating an acceptance signal if the differences between said characteristic features of said contemporaneously written sign and said previously written sign lie within first predetermined limits;

(3) if an acceptance signal cannot be generated, obtaining at least one further contemporaneously written sign and repeating steps (1) and (2) with respect to each further contemporaneously written sign;

(4) if an acceptance signal cannot be generated for any of said at least one further contemporaneously written sign, comparing the differences between the characteristic features of each contemporaneously written sign and the characteristic features of said previously written sign and, if all the differences fall within second predetermined limits; then (5) comparing characteristic features of each of said contemporaneously written signs with corresponding characteristic features of the remaining said contemporaneously written signs and generating an acceptance signal if the differences between said corresponding features of all of said contemporaneously written signs lie within third predetermined limits.

17. Apparatus according to claim 16, wherein said predetermined limits are defined by thresholds with which comparisons are made.

18. Apparatus according to claim 16, wherein said predetermined limits are defined by respective single thresholds representing upper limits.

19. Apparatus according to claim 6, wherein said at least one characteristic feature is a spatial characteristic feature.

20. Apparatus according to claim 16, wherein said second predetermined limits are greater than said first predetermined limits.

* * * * *